United States Patent [19]

Habicht

[11] Patent Number: 4,954,037
[45] Date of Patent: Sep. 4, 1990

[54] METHOD FOR ALIGNING, LIFTING AND TILTING A CONTAINER RELATIVE TO A VERTICAL APERTURE

[76] Inventor: Helmut Habicht, 15 Royal Park Ter., Hillsdale, N.J. 07642

[21] Appl. No.: 377,063

[22] Filed: Jul. 10, 1989

[51] Int. Cl.⁵ .............................................. B65G 65/23
[52] U.S. Cl. ..................................... 414/389; 414/420; 414/422; 414/629; 222/166
[58] Field of Search ............... 414/298, 192, 199, 303, 414/389, 403, 419, 420, 422, 629; 222/164, 165, 166, 608, 327

[56] References Cited

U.S. PATENT DOCUMENTS

| | | | |
|---|---|---|---|
| 2,388,987 | 11/1945 | Morrison | 414/420 X |
| 2,478,078 | 8/1949 | Battenfeld | 222/327 |
| 3,107,797 | 10/1963 | McFeaters et al. | 414/192 |
| 3,380,599 | 4/1968 | Cugini | 414/421 X |
| 3,421,640 | 1/1969 | Falk | 414/192 |
| 3,589,692 | 6/1971 | Lakin | 414/192 X |
| 4,797,050 | 1/1989 | Habicht | 414/420 |

FOREIGN PATENT DOCUMENTS 1235813  3/1967  Fed. Rep. of Germany ...... 414/420

Primary Examiner—Joseph J. Rolla
Assistant Examiner—Keith L. Dixon
Attorney, Agent, or Firm—Pinto, Patrick J.

[57] ABSTRACT

A method of discharging articles from a container into a defined vertical aperture in a wall or processing machine by rapidly tilting a lifting platform during a first lifting segment. This rapid tilting positions a discharge chute interior of the vertical aperture and then maintains the insertion of the discharge chute, during at least one subsequent lifting segment, as and when the lifting platform is brought to a fully lifted and tilted condition. A similar method using the first segment provides for the subsequent charging of a suitable container with articles emerging from a vertical aperture.

14 Claims, 4 Drawing Sheets

METHOD FOR ALIGNING, LIFTING AND TILTING A CONTAINER RELATIVE TO A VERTICAL APERTURE

BACKGROUND OF THE INVENTION

1. FIELD OF THE INVENTION

With respect to the classification of art as established in and by the United States Patent and Trademark Office, this invention is believed to be found in the general class entitled as "Material or Article Handling" and particularly in the subclasses pertaining to the method of rotating and aligning the mouth of a container with a vertical aperture.

The present invention is particularly directed to use in the process of applying a coating to molded or compressed articles such as caplets, tablets, pills, candy, chewing gum, and the like. It is also anticipated that other industries, such as those in the reclaiming, cleaning, or deburring of articles, may also utilize the method disclosed in the present invention.

2. DESCRIPTION OF THE PRIOR ART

The lifting and rotating of containers is the subject of several prior patents. Several patents representative thereof are:

U.S. Pat. No. 1,492,675 as issued to Clark et al on May 6, 1924;
U.S. Pat. No. 1,912,816 as issued to Anthony on June 6, 1933;
U.S. Pat. No. 2,131,771 as issued to Turnbull on Oct. 4, 1938;
U.S. Pat. No. 2,411,228 as issued to Poulsen on Nov. 19, 1946;
U.S. Pat. No. 2,647,651 as issued to Vincent on Aug. 4, 1953;
U.S. Pat. No. 2,657,815 as issued to Collins on Nov. 3, 1953;
U.S. Pat. No. 2,693,891 as issued to English on Nov. 9, 1954;
U.S. Pat. No. 2,797,835 as issued to Avery et al on July 2, 1957;
U.S. Pat. No. 2,888,157 as issued to Riley on May 26, 1959;
U.S. Pat. No. 3,298,552 as issued to Kuhner et al on Jan. 17, 1967;
U.S. Pat. No. 3,868,003 as issued to Le Duff on Feb. 25, 1975;
U.S. Pat. No. 3,942,663 as issued to Wentzel on Mar. 9, 1976,
and U.S. Pat. No. 4,797,050 as issued to Habicht on Jan. 10, 1989.

The Turnbull patent discloses a device for discharging articles, carried by a bucket, into a vertical opening. Turnbull teaches an arrangement of spaced guiding tracks and cables to lift and rotate the bucket. The balance of the referenced patents disclose devices which begin and complete the rotational movement between the mid-point and the upper extent of the lifting movement. U.S. Pat. No. 4,797,050 has been issued to the present inventor and is incorporated by reference into this specification.

In the previously referenced patents and as far as it is known, a method for lifting, tilting, and aligning a container with a vertical opening as herein described and shown, is not shown or suggested. This novel method of the present invention provides for discharging of articles from the container into an associated processing machine or mill by way of a vertical aperture or charging of a container from an associated processing machine by way of a vertical opening.

As far as it is known the transfer of articles to and/or from coating machines is a manual operation. This manual operation utilizes scoops, small pails and the like for the transfer.

It has been therefore determined that there is a need to provide a novel and efficient method for charging and discharging containers. This method should require a minimum amount of manual labor and handle the articles in a gentle manner to minimize breakage.

SUMMARY OF THE INVENTION

This invention may be summarized with respect to its objects.

It is an object of this invention to provide and it does provide a method for aligning, lifting and tilting a container relative to a vertical aperture of a process machine, said method providing for the discharge of articles from the container into and through the vertical aperture.

It is another object of this invention to provide and it does provide a method for aligning, lifting, and tilting a container relative to a vertical aperture in a process machine, said method providing for the charging of the container with articles from said processing machine. said articles passing through the vertical aperture then into the container.

It is a further object of this invention to provide and it does provide a method for aligning, lifting and tilting a container relative to a vertical opening, said method including the insertion of a chute into said vertical aperture during the first segment of the lifting motion and maintaining the insertion of the discharge chute into the vertical aperture as and when the container is brought to a fully tilted condition.

It is a still another object of this invention to provide and it does provide a method for aligning, lifting, and tilting a container relative to a vertical aperture of a process machine, said method adapted for use with mobile or fixed lifting equipment.

In addition to the above summary, the following disclosure is detailed to insure adequacy and aid in the understanding of this invention. This disclosure, however, is not intended to cover each new and inventive concept, no matter how it may later be disguised either by variations in form or additions by further improvements. For this reason, there has been chosen specific embodiments of a method for aligning, lifting and tilting a container. This method is adapted for use with mobile or fixed lifting and tilting equipment. These specific embodiments have been chosen for the purpose of illustration and description as shown in the accompanying drawings wherein:

BRIEF DESCRIPTION OF THE DRAWING

In the following description and in the claims, various details are identified by specific names for convenience. These names are intended to be generic in their application. The corresponding reference characters refer to like members throughout the several figures of the drawings.

The drawings accompanying, and forming a part of this specification disclose certain details of construction associated with a lifting platform. These details are for the purpose of explanation, but structural details may be modified without departure from the concept and principles of the invention. It is anticipated that this invention may be incorporated in forms other than as shown.

DETAILED DESCRIPTION OF FIGS. 1-7

Figure 1:
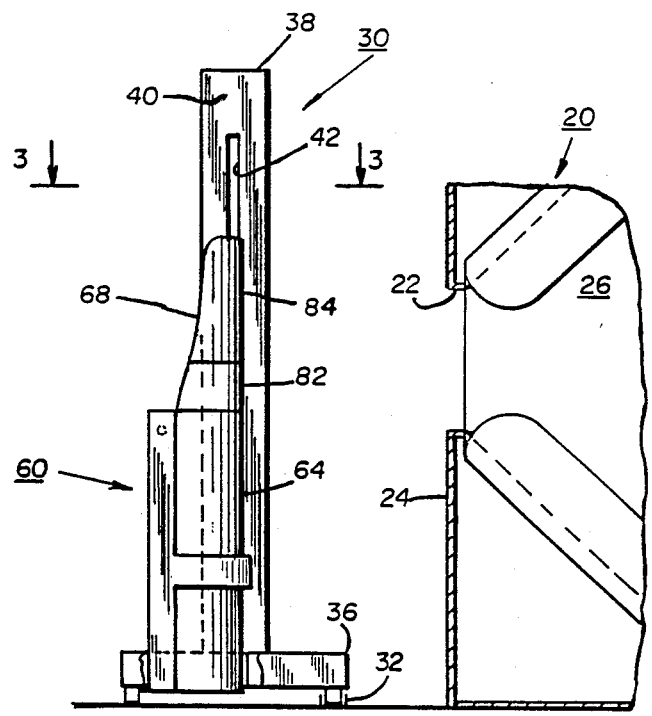
FIG. 1 represents a side elevation view, partly diagrammatic and with portions in section, of a lifting platform, this view particularly showing the positioning of the platform relative to a small vertical opening.
Figure 2:
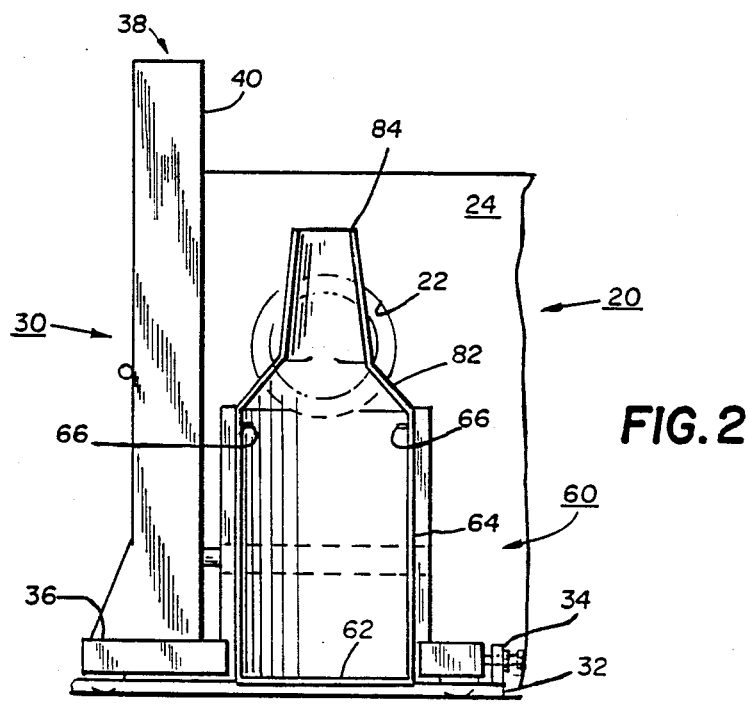
FIG. 2 represents a front elevational view of the lifting platform, this view particularly showing the alignment of a chute portion of the lifting platform relative to the vertical opening.

Referring in particular to FIG. 1 and FIG. 2, a processing machine generally identified as 20 is shown as having a defined aperture 22 located in a vertical wall member 24. The processing machine 20 has a rotating tumbler 26 in substantial alignment with the vertical aperture 22. This processing machine 20 may or may not be fitted with a door to close the aperture 22 during rotation of the tumbler.

A powered lift apparatus 30 is shown in a desired spaced alignment with the processing machine 20. This alignment is provided by a guiding track 32, which is shown as a channel fastened to the floor. An adjustable stop 34 is provided at the end of the guiding track 32. The guiding track 32 and adjustable stop 34 are used when the powered lifting apparatus 30 is of a mobile design. A stationary powered lift apparatus would be secured to the floor at a desired location.

Figure 3:
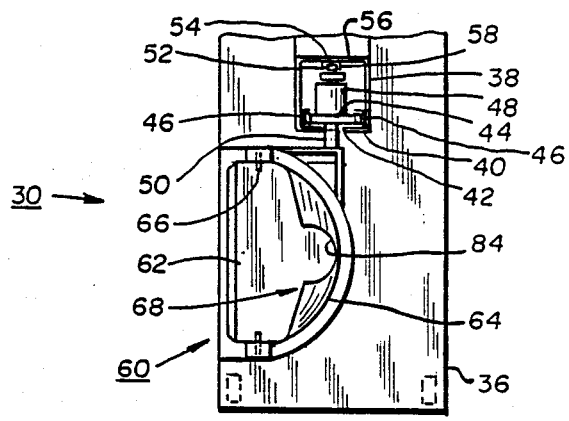
FIG. 3 represents a top plan view, partly diagrammatic, of the lifting platform, this view taken along line 3—3 of FIG. 1.

The powered lift apparatus 30 has a base member 36. A vertical column 38 is secured to the base 36 at a desired position. An elongated slot 42 is formed in one face 40 of the column 38. Referring to FIG. 3, a lifting carriage 44 is linearly carried in a pair of elongated vertical guideways 46. A housing portion 48 of the lifting carriage 44 carries a rotatable pivot shaft 50. A pivot arm 52 is mounted to a first end of the pivot shaft 50, interior of the column 38. A cam follower 54 is mounted at a selected position on the pivot arm 52. An elongated cam track 58 is secured to a wall 56 of the column 38. Wall 56 is preferably located opposite face 40. The engagement of the cam follower 54 in the cam track 58 provides rotation of the pivot shaft 50 as and when the lifting carriage 44 is moved upwardly or downwardly.

Figure 8:
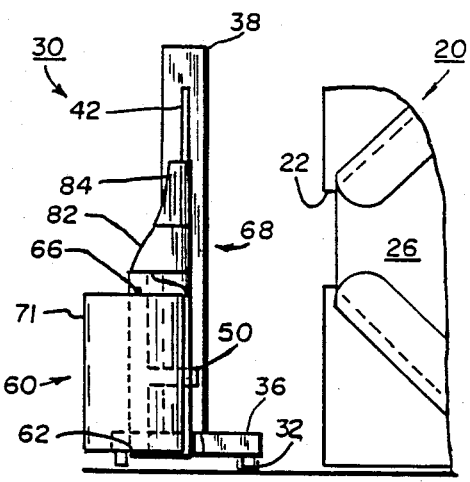
FIG. 8 represents a first of a sequence of views showing the discharging of a container into a vertical opening, this view showing the positioning of a container on the lifting platform.
Figure 6:
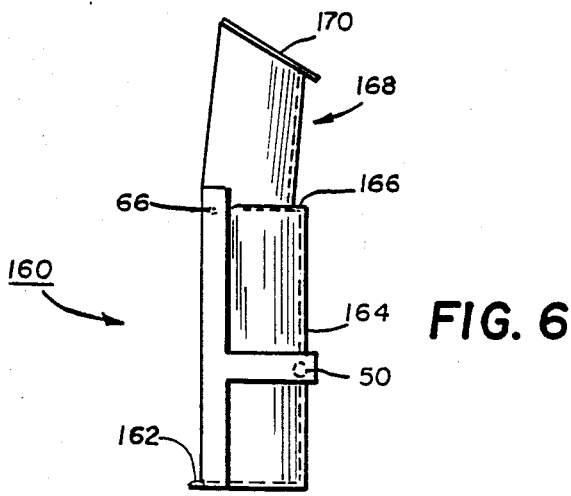
FIG. 6 represents a fragmentary view, in a reduced scale, of a lifting platform, this view showing a lifting platform arrayed with a charging chute.
Figure 12:
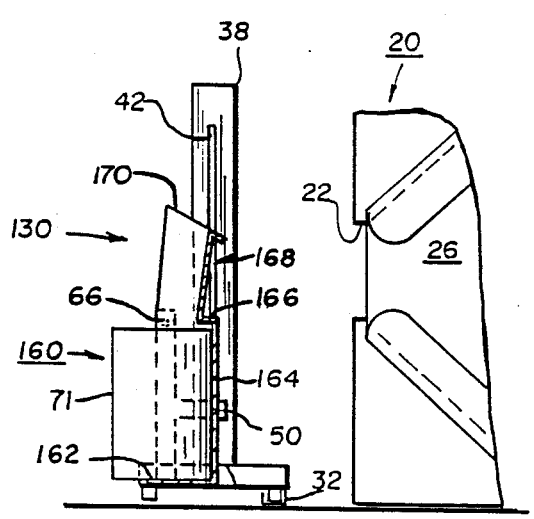
FIG. 12 represents a first of a sequence of views showing the charging of a container from a vertical opening, this view showing the positioning of a container on the lifting platform.

A lifting platform, generally identified as 60, is secured to a second end of the pivot shaft, distal the first end and exterior of the column 38. The slot 42 is sized to allow the pivot shaft 50 to rotate freely when and as desired during the lifting motion. The lifting platform 60 has a bottom shelf 62, a reinforced shaped sidewall 64 and retaining pins 66. The lifting platform 60 is fitted with an integral discharge chute 68, as shown in FIG. 1 and 2. A similar lifting platform 160 is shown fitted with a charging chute 168, as shown in FIG. 6. Lifting platforms 60 and 160 are adapted to allow the placement of a container 71 therein and thereon, as shown in FIG. 8 and FIG. 12 respectively.

Figure 4:
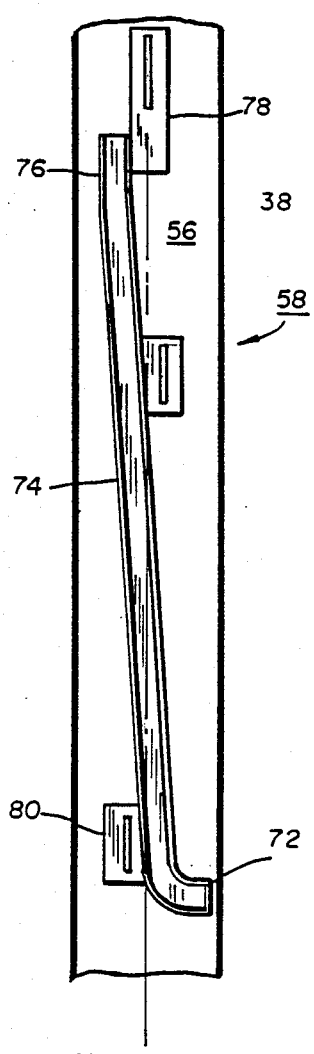
FIG. 4 represents a fragmentary elevational view, in an enlarged scale, this view showing the contour of a cam track for rotating the lifting platform.

Referring in particular to FIG. 4, a typical elongated cam track 58 is shown. Cam track 58 is arrayed with a first curved segment 72, an inclined second segment 74, and a vertical segment 76. This cam track 58 is secured to the wall 56 of the column 38 by mounting brackets 78 and 80. These mounting brackets are slotted to allow for fine adjustment of the cam track 58 relative to the column 38. The curved segment 72, provides a rapid rotation or tilting of the pivot shaft 50 in a short vertical movement of the lifting carriage 44. The inclined segment 74 provides a slower uniform angular rotation of the pivot shaft 50, during the continued vertical movement of the lifting carriage 44. The vertical segment 76 maintains the angular displacemt of the pivot shaft 50 during any small overtravel movement of the lifting carriage 44.

Figure 5:
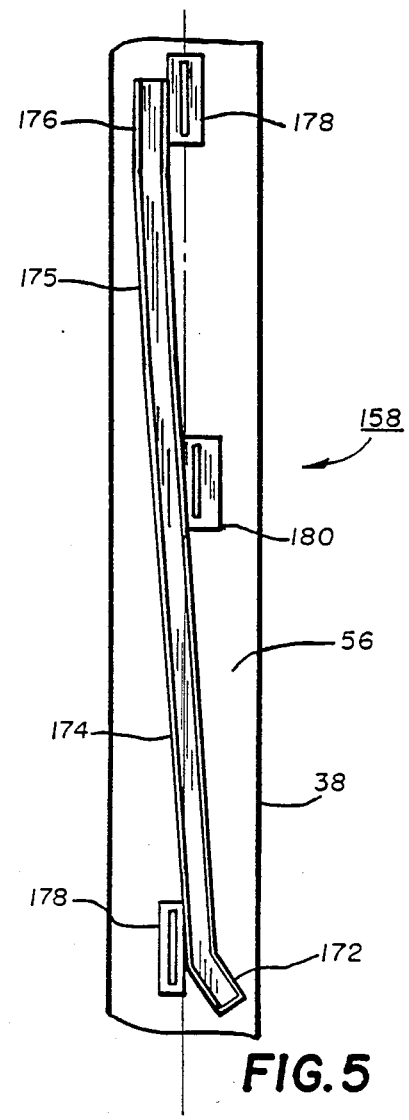
FIG. 5 represents a fragmentary elevational view of an alternate embodiment of a contoured cam track, this view in the same scale as FIG. 4.

Referring in particular to FIG. 5, an alternate cam track 158 is mounted and secured to wall 56 of the column 38 by means of mounting brackets 178 and 180. These mounting brackets 178 and 180 are provided with elongated slotted holes for allowing fine adjustment of the cam track 158 with respect to the column 38. Cam track 158 is arrayed with a first inclined segment 172, a second inclined segment 174, a third inclined segment 175, and a vertical segment 176. The first inclined segment 172 provides a rapid angular rotation or tilting of the pivot shaft 50 for a small amount of vertical lifting movement. The second inclined segment 174 provides a uniform angular rotation of the pivot shaft 50, at a slower rate than produced by the first segment 172. A third inclined segment 175 also provides a uniform angular rotation of the pivot arm 50, preferably the rate of rotation imparted by the third segment 175 is less than that of the second segment 174. The vertical segment 176 allows for any overtravel movement of the lifting platform 60 without further angular rotation.

As previously mentioned the lifting platform 60 or 160, may be provided with either a container discharging chute 68 or a container charging chute 168 respectively. Referring in particular to FIG. 1, FIG. 2, and FIG. 3, the discharging chute 68 is shown as having a semi-conical transition portion 82, and an elongated tapered nose portion 84. This nose portion 84 is adapted to fit into and through the vertical opening 22 and provide a clearance which eliminate any danger of damage to agitators which protrude interior of the tumbler 26.

Referring in particular to FIG. 6, there is shown one embodiment of a lifting platform 160 which has a bottom shelf 162, a reinforced shaped side-wall 164, a shelf portion 166, and a shaped nose portion 168. The shaped nose portion 168 has an inclined top edge 170 which is adapted to fit into the vertical opening 22 while being in substantially parallel alignment with a front vertical face of the tumbler 26.

The criteria for the shaping of discharge chute 68 and the charging chute 168 will become apparent later in this disclosure.

Figure 7:
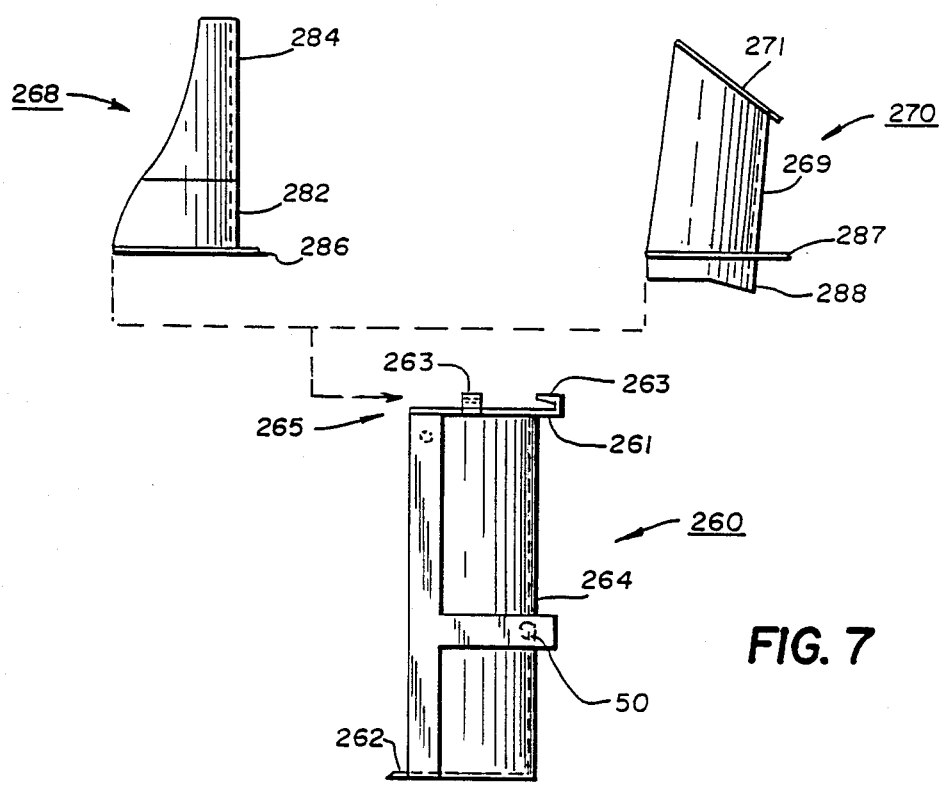
FIG. 7 represents a fragmentary view of a lifting platform, this view showing interchangeable chute members for charging or discharging of a container carried on the lifting platform.

Referring in particular to FIG. 7, an alternate embodiment of a lifting platform 260 is shown and described. This lifting platform 260 is similar in function to the previously described lifting platforms 60 and 160. Lifting platform 260 provides a method and means for attaching and detaching either a discharging chute 268 or a charging chute 270. The lifting platform 260 has a bottom shelf 262, shaped side wall portion 264, and a chute attachment means 265. This chute attachment means 265 is shown as having a flange portion 261 and a plurality of retaining lugs 263 secured to the flange 261 at desired spaced intervals.

A discharge chute 268 is similar in design and function to integral discharge chute 68. This discharge chute 268 has a semi-conical transition portion 282 and an elongated tapered nose portion 284. A flange 286 is secured to the enlarged end of the transition portion 282. This flange 286 is adapted to fit and mate with flange 261 and fit into retaining lugs 263. This chute attachment means 265 provides alignment of the interior surfaces of the lifting platform 260 and the discharge chute 268.

A charging chute 270 which is similar, in design and function, to charging chute 168 has a shaped side wall portion 269, a shaped top edge 271, a skirt portion 288, and a flange portion 287. The flange 287 is sized to align and mate with attachment means 265, for retention of the charging chute 270. It is to be noted that while one embodiment of an attachment means 265 has been shown and described, other means such as screws, pins, clamps and the like may be used to align and retain either the interchangeable discharge chute 268 or the charging chute 270 to the lifting platform 260.

EMBODIMENT OF FIG. 8–11

Referring in particular to FIG. 8, a mobile lifting apparatus 30 is brought into a desired spaced alignment with the process machine 20. The alignment means chosen for illustration purpose is a channel shaped track 32 with an adjustable stop 34 cooperating with the track 32 to position the lifting apparatus 30 as shown in FIG. 2. In the preferred alignment, the vertical axis of the lifting platform 60 is in substantial alignment with the center of the vertical aperture 22. A container 71, filled with product, is carried to the process machine 20 by and on the mobile lifting apparatus 30. The container 71 is positioned on the bottom shelf 62 of the lifting platform 60 when and as the platform 60 is in a more or less fully lowered or start position. The container 71 is also positioned under retaining pins 66. A safety chain or strap, not shown, may be also used along with the retaining pins 66 to hold the container 71 in position on the lifting platform 60 during the lifting operation. In FIG. 8, the lifting platform 60 has been cut-away to show the position of the container 71 with relationship to the lifting platform 60. The container 71 is held in a more or less vertical or start position by and on the lifting platform 60. The position of the lifting platform 60 is controlled by the pivot shaft 50. The lifting movement of the pivot shaft 50 is provided by a power type linear actuator The rotation or tilting of the pivot shaft is controlled by the interaction of the cam follower 54, which is mounted on the pivot arm 52, with the cam track 58.

Figure 9:
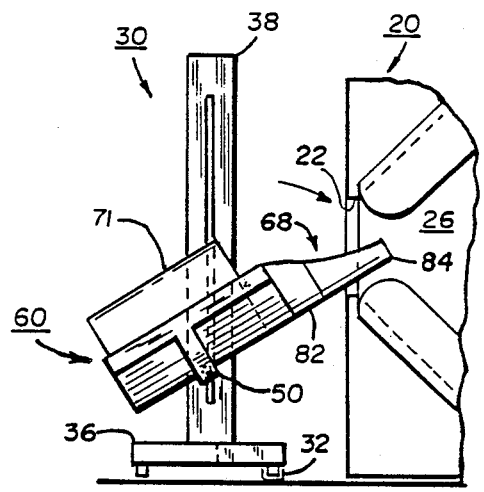
FIG. 9 represents the second of the discharging sequence, this view showing the rotation of the lifting platform substantially at the end of a first segment of the lift.

Referring to FIG. 9, the container 71 and the lifting platform 60 have been rotated to a desired tilt. Preferably this rapid tilting segment begins immediately as and when the lifting platform 60 is moved vertically. As an example, for a vertical lift of 20.3 CM. (8 in.) the container is tilted 63° from a vertical position. The nose portion 84 of the discharge chute 68 has been positioned into and through the vertical aperture 22 and interior of the tumbler 26.

Figure 10:
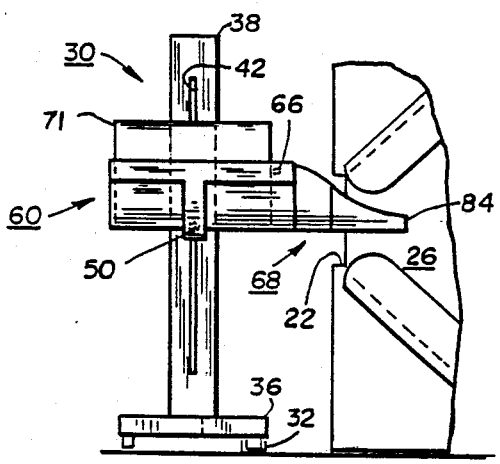
FIG. 10 represents a third of the discharging sequence, this view showing the lifting platform at a more or less horizontal attitude, during a subsequent segment of lift.

Referring FIG. 10, the container 71 and lifting platform 60 have been raised to a higher position during a subsequent lifting segment. This position places the container 71 in a more or less horizontal position as and when the pivot shaft 50 is brought into substantial alignment with the center of the vertical aperture 24 and the tumbler 26. For example the pivot shaft 50 has been lifted 68.58 CM. (27 in.). The nose portion 84 of the discharge chute 68 continues to be positioned interior of the tumbler 26. This positioning of the nose portion 84 within the tumbler 26 allows any articles which begin to discharge from the container 71 to fall onto the discharge chute 68 then guided into the tumbler 26.

Figure 11:
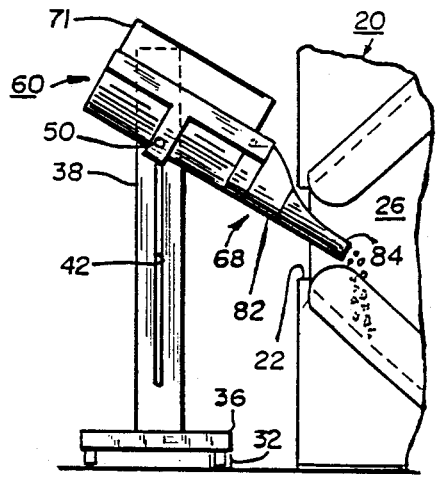
FIG. 11 represents a fourth of the discharging sequence, this view showing the lifting platform in a more or less fully lifted and tilted attitude.

Referring in particular to FIG. 11, the container 71 and the lifting platform 60 are shown in a more or less fully lifted and tilted condition at or near the end of the last tilting segment. The container 71 rests against the retaining pins 66. The nose portion 84 of the discharge chute 68 continues to be positioned interior of the vertical aperture 24 and the tumbler 26. Maintaining the nose portion 84 interior of the vertical aperture 24 and the tumbler 26 is necessary to prevent any articles, being discharged from the container 71, from falling onto the floor. As an example, the container 71 has been rotated or tilted through an included angle of 120 degrees during a total lift of 111.8 CM. (44.5 in.).

After all of the articles are discharged, the lifting platform 60, carrying the empty container 71, is lowered to its start position, with the container in a more or less vertical condition, as shown in FIG. 8. The process machine 20 is operated to process the articles. During the processing cycle the mobile lifting apparatus is removed from the area in front of the processing machine 20.

Figure 13:
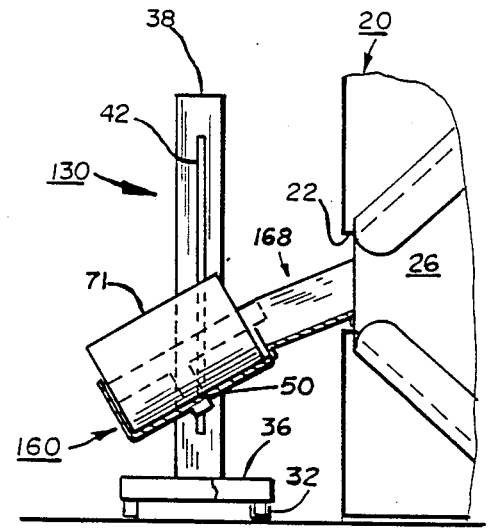
FIG. 13 represents a second view of the charging sequence, this view showing the lifted and rotated attitude of the lifting platform, this view also showing the position of the charging chute relative to the vertical opening.

DESCRIPTION OF FIG. 12 and 13

The processing cycle generally includes the rotation of the tumbler 26 in a desire direction to coat, clean or deburr articles. The direction of rotation and the design of the agitators interior of the tumbler 26 provide the necessary processing action. Some process equipment may require manual removal of the articles, whereas other process machinery have been designed to automatically remove any articles within the tumbler by reversing the direction of tumbler rotation. Referring in particular to FIG. 12, a mobile lifting apparatus 130 is selectively positioned and aligned with the process machine 20. The preferred alignment positions the vertical axis of the lifting platform 160 in substantial alignment with the center of the vertical aperture 24. This lifting platform 160 is fitted with an integral charging chute 168. A suitable container 71, which is empty or partially filled, is carried by and on the lifting platform 160. The lifting platform 160 is lifted by a powered linear actuator.

Referring to FIG. 13, the lifting platform 160 is lifted and rapidly rotates to a position which abuts the face of the tumbler 26. The top edge 170 of the nose portion 168 may be fitted with a flange, felt, or a plastic edging which aligns with a suitable portion of the processing machine, during the reverse rotation of the tumbler 26 for removal of the articles. The articles leaving the tumbler 26 are guided down the nose portion 168. The shelf 166 provides a raised surface to allow the articles to fall into the container. The container has been rotated 63 degrees from the vertical. This rotation of the container 71 places the side walls of the container at more or less 27 degree angle with the floor. This angle provides a gentle slope for the articles being charged into the container 71. After the tumbler 26 is emptied or when the container 71 is sufficiently filled, the lifting platform 160 is lowered to a start position as shown in FIG. 12.

OPERATION OF THE EMBODIMENT OF FIG. 7

The above disclosure teaches or suggests the use of separate mobile lifting apparatus 30 for discharging or charging a container 71. When and if a stationary lifting platform 30 is positioned and mounted in spaced alignment with a process machine 20, it is necessary to provide a convenient method for discharging or charging of a container 71.

The stationary lifting apparatus 30 utilizes a universal lifting platform 260 mounted to the pivot shaft 50. When and as it is desired to discharge the articles in a container 71 into a vertical aperture 22 of a process machine 20, a discharging chute 268 is positioned on and retained by a chute attachment means 265. The lifting apparatus is cycled as in FIG. 8 through FIG. 11. The operation of the apparatus is substantially the same as previously described in FIG. 8 through FIG. 11. After the articles have been emptied from the container, the lifting apparatus 30 is brought to a fully lowered position.

An operator removes the discharging chute 268 from the lifting platform 260. A charging chute 270 is positioned and retained in an attachment means 265 on the lifting platform 260. At the end of the process cycle, the lifting platform 260 is raised as shown in FIG. 13. The tumbler 26 is rotated in the reverse direction to remove the articles from the tumbler. The articles are guide down the side wall 269 then over the skirt portion 288, and finally into the container 71. After the container is filled to the desired level, the lifting platform 260 is lowered to its start position as shown in FIG. 12. It is to be noted that while the embodiment of FIG. 7 has been described in connection with a stationary lifting device, this embodiment will operate equally as well when mounted on a mobile lifting apparatus, or whether the lifting apparatus has a left hand tilt, as shown, or a right hand tilt, mirror image.

It is to be noted further that each of the cam tracks 58 and 158 will provide an immediate and rapid rotation of the lifting platform as and when it is lifted a small distance during the first segment 72 or 172 of the cam track 58 or 158. Since there are various manufacturers of process machinery it is anticipated that slight modifications will be necessary to the contour of the cam tracks to provide the proper discharging or charging of a container.

In the above disclosure one alignment means is shown and described in the various figures of the drawings. However, it is anticipated that this alignment means may take the simple form of suitable markings made on the floor, a male/female coupling arrangement or the like. Should the mobile lifting apparatus be of the automated robotic type, guiding wires may be place in the floor along with a position detecting means to control the stopping position of the lifting apparatus. In this case the mobile lifting apparatus would be self-propelled. It is anticipated that the lifting platform will be lifted by a suitable linear actuator, which may be powered by pneumatic, hydraulic, or electro-mechanical means and the tilting of the lifting platform may be provided by a processor controlled servo-motor, which may be powered electrically or hydraulically.

Although apparatus for lifting and tilting containers are known, these insofar as it is known are not used to discharge or: charge a container by way of a vertical aperture in a wall of a processing machine. The above discharging and charging method as exemplified in the embodiments shown and described above result in a convenient and practical method for processing articles. The method includes the following steps:

aligning a vertical major axis of a discharge lifting platform in spaced relationship with the center of the vertical aperture, said discharge lifting platform having a bottom shelf and an elongated discharge chute;

retaining a container of articles on the bottom shelf of the discharge lifting platform in a substantially vertical array;

inserting the tapered discharge chute into and through the vertical aperture by lifting and rapidly tilting the discharge lifting platform during a first segment of the lifting movement;

maintaining the insertion of the tapered discharge chute in and through the vertical aperture by tilting the discharge platform at a slower uniform angular rate during at least one subsequent lifting segment as and when the lifting platform is brought to a fully lifted height;

guiding the articles discharging from the container into and through the vertical aperture by carrying the articles on and over the tapered discharge chute;

returning the empty container to a starting position by lowering and tilting the discharge lifting platform and bringing its major axis to a substantially vertical array;

removing said discharge lifting platform from alignment with the vertical aperture;

placing a major axis of a charging lifting platform in a substantially vertical array by positioning a bottom shelf of the charging platform in a substantially downward and horizontal condition, and a elongated shaped charging chute in a upwardly extending vertical condition;

aligning the vertical major axis of a charging lifting platform in spaced relationship with the center of a vertical aperture;

positioning and retaining a container suitable for charging with articles on said bottom shelf of the charging lifting platform;

abutting the top edge of the charging chute against the vertical opening by lifting and rapidly tilting the charging lifting platform;

guiding the articles emerging from said vertical opening to the container suitable for charging by carrying the articles on and over the charging chute;

returning the charged container to a more or less starting position by lowering and tilting the charging lifting platform and bringing the major axis of the charging lifting platform to a substantially vertical condition.

Terms such as "left", "right", "up", "Down", "bottom", "top", "front", "back", "in", "out" and the like are applicable to the embodiments shown and described in conjunction with the drawings. These terms are merely for the purpose of description and do not necessarily apply to the position in which the Lifting and tilting method of the present invention may be employed.

While these particular embodiments of a Lifting and Tilting apparatus and method have been shown and described, it is to be understood that the invention is not limited thereto and protection is sought to the broadest extent the prior art allows.

What is claimed is:

1. A method of discharging articles from a container into a defined substantially vertical aperture by lifting and selectively tilting the container carried on a discharge lifting platform of a power assisted lifting apparatus which includes the following steps:
   (a) placing a major axis of the discharge lifting platform in a substantially vertical array by positioning a bottom shelf of the discharge lifting platform in a substantially downward and horizontal condition, and a tapered discharge chute in an upwardly extending vertical condition;
   (b) aligning the vertical major axis of the discharge lifting platform in a selected spaced relationship with the center of the vertical aperture;
   (c) retaining the container of articles on the bottom shelf of the discharge lifting platform in substantially vertical array;
   (d) simultaneously inserting the tapered discharge chute into and through the vertical aperture while lifting and rapidly tilting the discharge lifting platform during a first segment of the lifting movement;
   (e) maintaining the insertion of the tapered discharge chute in and through the vertical aperture by tilting the discharge lifting platform at a slower uniform angular rate during at least one subsequent lifting segment as and when the discharging platform is brought to a fully lifted height;
   (f) guiding the articles discharging from the container into and through the vertical aperture by carrying the articles on and over the tapered discharge chute;
   (g) returning the empty container to a more or less starting position by lowering and tilting the discharge lifting platform and bringing its major axis to substantially vertical array.

2. A method as recited in claim 1 wherein the step of aligning the vertical major axis of the discharging lifting platform in a selected spaced relationship with the center of the vertical aperture includes the further steps of:
   (a) guiding a plurality of wheels supporting the powered lifting apparatus by and with a selectively positioned track, and
   (b) stopping the movement of the lifting apparatus by abutting an adjusted stop.

3. A method as recited in claim 1 wherein the step of retaining the container further includes the step of engaging a top open surface of the container by a plurality of retaining pins.

4. A method as recited in claim 1 which includes the following additional steps of:
   (a) said lifting of the discharge lifting platform by energizing a linear actuator;
   (b) said tilting of the discharge lifting platform by camming a pivot shaft attached to the discharge lifting platform, and
   (c) said lowering of the discharge lifting platform by reversing the linear actuator.

5. A method as recited in claim 4 wherein the step of camming includes a first rapid tilting segment, a second slower uniform rate tilting segment, and a third yet slower uniform rate tilting segment.

6. A method of discharging articles from a container into a defined substantially vertical aperture by lifting and selectively tilting the container carried on a discharge lifting platform of a power assisted lifting apparatus and subsequently charging a suitable container carried on a charging platform of a second power assisted apparatus from said vertical aperture, which includes the following steps:
   (a) placing a major axis of the discharge lifting platform in a substantially vertical array by positioning a bottom shelf of the discharge lifting platform in a substantially downward and horizontal condition and a tapered discharge chute in a upwardly extending vertical position;
   (b) aligning the vertical major axis of the discharge lifting platform in a selected spaced relationship with the center of the vertical aperture;
   (c) retaining the container of articles on the bottom shelf of the discharge lifting platform in substantially vertical array;
   (d) inserting the tapered discharge chute into and through the vertical aperture by lifting and rapidly tilting the discharge lifting platform during a first segment of the lifting movement;
   (e) maintaining the insertion of the tapered discharge chute in and through the vertical aperture by tilting the discharge lifting platform at a slower uniform angular rate during at least one subsequent lifting segment as and when the discharge lifting platform is brought to a fully lifted height;
   (f) guiding the articles discharging from the container into and through the vertical aperture by carrying the articles on and over the tapered discharge chute;
   (g) returning the now empty container to a more or less starting position by lowering and tilting the discharge lifting platform and bringing its major axis to a substantially vertical array;
   (h) removing said discharge lifting platform from alignment with the vertical aperture;
   (i) placing a major axis of a charging lifting platform in a substantially vertical array by positioning a bottom support of the charging lifting platform in a substantially downward and horizontal condition, and a contoured charging chute in a upwardly extending vertical condition;
(j) Aligning the major axis of the charging lifting platform in a selected spaced relationship with the center of the vertical aperture;
(k) retaining the suitable container on the bottom support of the charging lifting platform in a substantially vertical array;
(l) abutting a top edge of the shaped charging chute in substantially parallel alignment with the vertical aperture by selectively lifting and rapidly tilting the charging lifting platform;
(m) by carrying the articles from the vertical aperture into the suitable container by carrying the articles on and over the shaped charging chute, and
(n) returning the suitable container with articles to a more or less starting position by lowering and tilting the charging lifting platform and bringing the major axis of the charging platform to a substantially vertical array.

7. A method as recited in claim 6 wherein the step of aligning the vertical major axis of the discharging lifting platform in a selected spaced relationship with the center of the vertical aperture includes the further steps of:
(a) guiding a plurality of wheels supporting a power assisted lifting apparatus by a selectively positioned track, and
(b) stopping the movement of said power assisted lifting apparatus by abutting an adjusted stop.

8. A method as recited in claim 7 wherein the step of aligning the major axis of the charging lifting platform in a selected spaced relationship with the center of a vertical aperture includes the further steps of:
(a) guiding a plurality of wheels supporting a second power assisted lifting platform by said selectively positioned track, and
(b) stopping the movement of the second power assisted lifting apparatus by said adjusted stop.

9. A method as recited in claim 6 which includes the further steps of:
(a) the lifting the discharge lifting platform by energizing a linear actuator;
(b) said tilting of the discharge lifting platform by camming a pivot shaft attached to the discharge lifting platform, and
(c) the lowering of the discharge lifting platform by reversing the linear actuator.

10. A method as recited in claim 9 which includes the further steps of:
(a) the lifting of the charging lifting platform by energizing a linear actuator on the second power assisted lifting apparatus;
(b) the tilting of the charging lifting platform by camming a pivot shaft attached to the charging lifting platform, and
(c) said lowering of the charging lifting platform by reversing the linear actuator of the second power assisted lifting apparatus.

11. A method of discharging articles from a container into a defined substantially vertical aperture by lifting and selectively tilting the container carried on a lifting platform adapted for discharging, said lifting platform carried on a power assisted apparatus and subsequently charging the container carried on the lifting platform adapted for charging of the container, which includes the following steps of:
(a) placing a major axis of the lifting platform in a substantially vertical array by positioning a bottom shelf of the lifting platform in a substantially downward and horizontal condition;
(b) placing a tapered discharge chute in selected alignment with the lifting platform by engaging an attachment means;
(c) aligning the vertical major axis of the lifting platform in a selected spaced relationship with the center of the vertical aperture;
(d) retaining the container of articles on the bottom shelf of the lifting platform in substantial vertical array;
(e) inserting the tapered discharge chute into and through the vertical aperture by lifting and rapidly tilting the lifting platform during a first segment of the lifting movement;
(f) maintaining the insertion of the tapered discharge chute in and through the vertical aperture by tilting the lifting platform at a slower uniform rate during at least one subsequent segment as and when the lifting platform is brought to a fully lifted height;
(g) guiding the articles discharging from the container into and through the vertical aperture by carrying the articles on and over the tapered discharge chute;
(h) returning the now empty container to a more or less starting position by lowering and tilting the lifting platform and bringing its major axis to a substantially vertical array;
(i) removing said discharge chute by disengaging the attachment means;
(j) placing a contoured charging chute on the lifting platform in a selected alignment by engaging the attachement means;
(k) abutting a top edge of the contoured charging chute in substantially parallel alignment with the vertical aperture by selectively lifting and rapidly tilting the lifting platform;
(l) guiding the articles from the vertical by carrying the articles emerging from the vertical aperture on and over charging chute, and
(m) returning the container with articles to a more or less starting position by lowering and tilting the lifting platform and bringing the major axis of the lifting platform to a substantially vertical array.

12. A method as recited in claim 11 wherein the step of retaining the container further includes the step of engaging a top open surface of the container by a plurality of retaining pins.

13. A method as recited in claim 11 which includes the following additional steps of:
(a) said lifting of the lifting platform by energizing a linear actuator;
(b) said tilting of the lifting platform by camming a pivot shaft attached to the lifting platform, and
(c) said lowering of the lifting platform by reversing the linear actuator.

14. A method as recited in claim 13 wherein the camming includes a first rapid tilting segment, a second slower uniform tilting segment, and a third yet slower uniform rate tilting segment.

* * * * *

UNITED STATES PATENT AND TRADEMARK OFFICE
CERTIFICATE OF CORRECTION

PATENT NO. : 4,954,037
DATED : 9/4/90
INVENTOR(S) : Helmut Habicht

It is certified that error appears in the above-identified patent and that said Letters Patent is hereby corrected as shown below:

Column 11, line 15, "sub (m)" should read --(m) by carrying the articles emerging from the vertical aperture--.

Column 12, line 43, "sub (l)" should read --(l) guiding the articles from the vertical aperture into the suitable container by carrying the articles emerging--.

Signed and Sealed this

Nineteenth Day of May, 1992

Attest:

DOUGLAS B. COMER

*Attesting Officer*       *Acting Commissioner of Patents and Trademarks*